Feb. 21, 1939.  H. G. CISIN  2,148,259
GAME
Filed Sept. 30, 1938

Harry G. Cisin
INVENTOR

Frank P. Wentworth
BY
his ATTORNEY.

Patented Feb. 21, 1939

2,148,259

UNITED STATES PATENT OFFICE 2,148,259

GAME

Harry G. Cisin, Brooklyn, N. Y., assignor of one-half to Harry G. Cisin and one-half to Arthur D. Schneider and Charles Lichtenstein, as trustees Application September 30, 1938, Serial No. 232,510

14 Claims. (Cl. 35—9)

The invention relates to games, and more particularly to a game embodying therein an apparatus which will automatically register the accuracy or inaccuracy of the response by a player to a given statement or question.

In the playing of the game, the applicant is handed an indicator member which is required to be positioned upon a base, said base and said indicator member being provided with co-operating electrical connections, so arranged that a correct or incorrect positioning of the indicator member upon the board will close an electric circuit to a translating device, the actuation of which will apprize the player whether or not his knowledge upon the subject corresponds with the actual fact.

The base, and the electrical appliances and connections carried thereby, is such that the player is given a choice of declaring the statement upon the indicator member as either true or false, or to answer the question either yes or no, and the translating device, irrespective of the position of the indicator member, will be actuated to indicate whether or not the player has accurate knowledge of the subject presented upon the indicator member.

The wiring of the base perferably is concealed, and the indicator member is so constructed as to give the player no insight into how it must be placed in order to give a correct response to the proposition appearing upon that member.

With the apparatus to be used in the playing of the game, the correct positioning of the indicator member to cause the actuation of the translating device is predetermined by the construction of the indicator member, but there is nothing in this member to indicate, by its appearance to the eye or by a sense of touch, what its position upon the base must be in giving a correct answer.

The energy for actuating the translating device is, to avoid possible startling of, or injury to, a player, preferably derived from a low potential source, the base preferably being provided with a holder for a dry cell which will permit a convenient mounting and removal of a cell in its relation to the base and to the electrical wiring carried thereby.

In a game embodying the invention, the number of propositions which may be propounded upon different indicator members is unlimited, and the construction of the indicator members is such that they may be used an indefinite number of times without impairing the operative effect of the apparatus in apprizing a player whether or not his knowledge of the propounded question is sound.

In a game embodying the invention, if each player is required to use a number of indicator members and the proposition upon each member is not announced, the percentage of correctness or error may be recorded, and the same indicator members may be mixed and handed to another player whose knowledge may be accurately tested without the player being aware of how previous players have positioned any indicator members upon the base. In other words, the knowledge or lack of knowledge of one player cannot be taken advantage of by a subsequent player so long as there is no audible statement of the proposition, or of the truth or falsity of the answer by a previous player.

The invention consists primarily in a game embodying therein a base having a plurality of pairs of electrical contacts arranged in spaced relation to each other and to the contacts of other pairs, and indicia thereon having diametrically opposite meanings adjacent the respective pairs of contacts, a translating device, an electrical source, electrical connections between said source and one of each of said pair of contacts, and the other contact of each pair and said translating device, and a detector member adapted to be selectively positioned in relation to different pairs of contacts, said member having indicated thereon matter, the truth or falsity of which may be determined according to the positioning of this member in relation to the different pairs of contacts, said detector member having electro-conductive and electro-non-conductive portions, whereby said translating device may be energized by closing the circuit through either pair of contacts according to the positioning of the electro-conductive portion upon said detector member; and in such other novel features and construction of parts as are hereinafter set forth and described, and more particularly pointed out in the claims hereto appended.

Referring to the drawing.

Like numerals refer to like parts throughout the several views.

Figure 1:
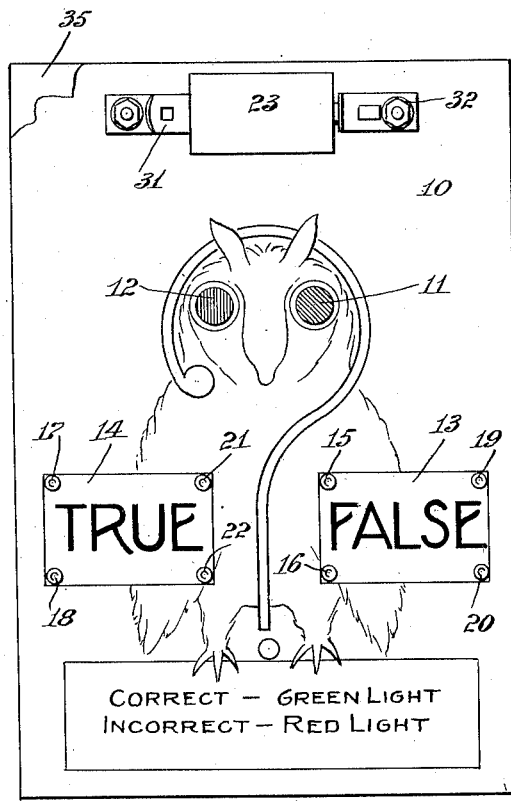
Fig. 1 is a plan view of the base.

The game of the invention, shown in the accompanying drawing, embodies therein a base 10 having exposed at one face thereof, a suitable translating device and means for closing the circuit to this device.

The exposed face of this base must be of insulating material, and to avoid the necessity for insulating the various contacts and conductors used, I preferably make the base 10 of heavy cardboard, thin wood or other suitable electro-nonconducting material.

In the form of the invention shown, I provide two translating devices 11 and 12, consisting of miniature incandescent electric lamps, one of which, as 11, has a green bulb, and the other, as 12, has a red bulb.

Impressed upon the exposed face of the base 10 are two panels 13 and 14, these panels having impressed thereon indicia having diametrically opposite meanings, such as "True" and "False"; "Yes"—"No"; "Right"—"Wrong" or "Correct" and "Incorrect".

As will more fully appear hereinafter, the purpose of these panels is to ensure a correct positioning of an indicator member when a player expresses his views as to the correctness or incorrectness of a proposition printed upon this indicator member, or the answer to a question appearing upon such a member.

The base 10 is provided with a plurality of pairs of electrical contacts, arranged in spaced relation to each other and to the contacts of the other pair, each pair of contacts being located in relation to a panel 13 or 14, the contacts upon one panel co-operating with a translating device being differently positioned in relation to the panel than those upon the other panel co-operating with the same translating device.

In the accompanying drawing, two translating devices are shown, and each panel has associated therewith two pairs of electrical contacts. The contacts 15 and 16 associated with the panel 13 are for closing an electrical circuit to the translating device 11, and the contacts 17 and 18, associated with the panel 14, are also for closing a circuit to said translating device 11. It will be noted that the contacts 15 and 16 are positioned adjacent the inner edge of the panel 13, while the contacts 17 and 18 are positioned adjacent the outer edge of the panel 14.

The panel 13 also has associated therewith a pair of electrical contacts 19 and 20 adjacent the outer edge thereof, while the panel 14 has associated therewith a pair of electrical contacts 21 and 22 adjacent the inner edge of the panel 14. Each pair of contacts 19—20, 21—22 is adapted to close a circuit to the translating device 12.

Each of the contacts 15 to 22, as shown in the drawing, consists of a hollow rivet passing through the base 10, these rivets being connected with electrical conductors at the back of the base 10 so as to be concealed from those using the game apparatus.

Figure 2:
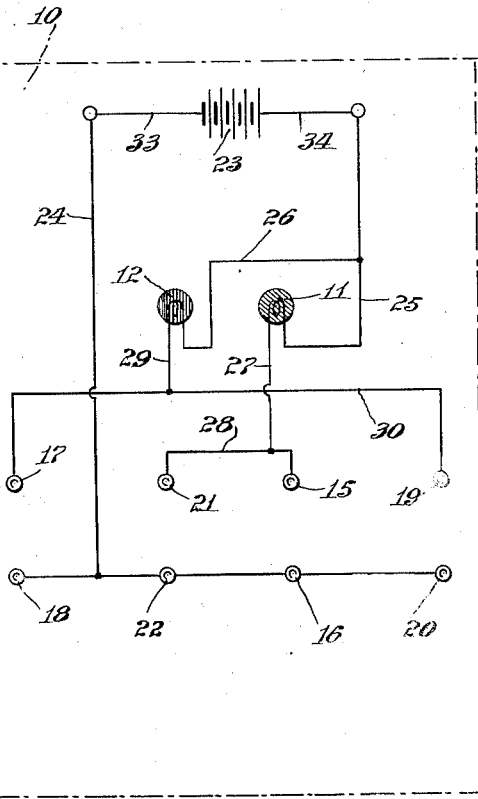
Fig. 2 is an electric diagram showing the wiring of said base.

In Fig. 2 of the drawing, I have shown a wiring diagram of the manner of connecting the various contacts and the translating devices with a source of current supply. This source consists of an ordinary dry cell 23, one pole of which is connected by the line 24 with one contact 16—18—20—22 of each pair of contacts.

One terminal of the translating device 11 is connected by the lead 25 directly with the opposite pole of the battery to which the lead 24 is connected, while one terminal of the translating device 12 is connected by a branch lead 26 with the lead 25. The other terminal of the translating device 11 is connected by the lead 27 with the contact 15, and the contact 21 is connected with the lead 27 by the lead 28. The other terminal of the translating device 12 is connected with the contact 17 by the lead 29, and the contact 19 is connected by a branch lead 30 with the lead 29.

In this manner, each translating device is connected with a pair of contacts associated with each panel 13—14, which contacts, as heretofore stated, are dissimilarly positioned in relation to the panel with which they are associated. The operation of the device resulting from this arrangement will be later described.

The dry cell 23 is preferably mounted at some accessible point upon the base 10, as by means of contact clips 31 and 32, as indicated in Fig. 2, by the leads 33 and 34 respectively, which leads, as shown in Fig. 2, are connected with the leads 24 and 25.

The base 10 may be, and preferably is, provided with a backing 35 of paper or other insulating material protecting and concealing the wiring of the device.

The manner of mounting the lamp bulbs 11 and 12 upon the base is immaterial to the invention, it being possible to either cement these bulbs permanently in position upon the base or to provide a lamp socket such as is commonly used with miniature lamps.

The contacts 15 to 22 preferably consist of tubular rivets passing through and engaging the electrical conductors to be connected therewith, this construction ensuring a slight projection of the contacts above the plane of the base 10.

The use of detector members adapted under different conditions to close the circuit to one lamp 11—12 or the other, according to the predetermined construction of said detector member and the panel upon which it is placed by the player, is essential. The construction of the detector member is such that the player, in placing it upon a panel, must be guided solely by his opinion as to the correctness or incorrectness of the proposition or question appearing upon the detector member. What circuit will be closed when placing the detector member upon a panel is a mystery to the player. The wiring of the base is concealed from the player. The construction of the indicator member is such as to indicate that engagement thereof with all of the contacts of the panel is necessary in order to light a lamp. The limited knowledge of the general public in electrical matters is a factor in imparting a large measure of mystery in the playing of the game.

Figure 3:
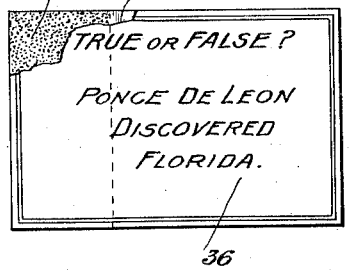
Fig. 3 is a top view, partly broken away, of an indicator member.
Figure 4:
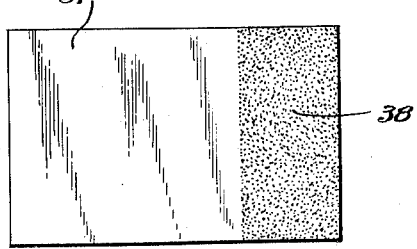
Fig. 4 is a view of the reverse side of said member.

In Figs. 3 and 4, I have shown upon a larger scale, the opposite sides of a detector member forming a part of the game. In practice, this detector member corresponds in dimensions with each panel 13 and 14. The member consists of a sheet of electro-non-conductive material 36, forming the top of the member, and having impressed thereon a statement or a question, as to which the player is required to express an opinion by placing the detector member either upon the panel 13 or 14. By the placing of the detector member upon a panel the player expresses an opinion, and the device is for the purpose of indicating whether that opinion is right or wrong, and not whether the proposition or the question is right or wrong.

The form of the detector member shown in the drawing has, upon the back of the sheet of insulating material, a coating 37 of electro-conductive material, such as a metal foil. This coating extends throughout the entire area of the member. In the playing of the game, it is essential, however, that only one translating device or lamp be actuated at a time. Since the pairs of contacts associated with one panel are electrically connected, one pair with one translating device and the other pair with the other translating device, the presence of an electro-conductive surface 37 throughout the back of the detector member would close the circuits to both translating devices, thus making the device totally inoperative.

To prevent this simultaneous closing of the circuits to both translating devices as well as to increase the mystery as to the action of the device when playing the game, a concealment of the contact member bridging one pair of contacts including one lamp or the other, is necessary. The construction of the detector member must be such that neither by the eye nor by touch can the player determine what portion of the detector member constitutes this bridging contact. This concealment can be effected by an actual covering of the bridging contact member or, as in the embodiment of the invention shown in Figs. 3 and 4, by the exposure of the bridging contact member in a manner which makes it obvious to the player that what he sees can have nothing to do with the electrical conditions about the base.

In order to secure the latter result, I provide a coating of electro-non-conductive material 38 throughout that portion of the coating 37 necessary to close the circuit through one pair of contacts associated with a panel. This coating material may be of the same color as the metal foil coating 37, or of transparent material through which the metal foil coating is so clearly visible as to make the coating of insulating material invisible.

With a low potential current, only a thin coating of this transparent or colored insulating material is necessary, so that its presence cannot be detected by feeling of the back of the detector member. Collodion, shellac and different kinds of well known lacquers having insulating properties may be used.

While I have shown the coating 38 as extending from top to bottom of the detector member, it is obvious that it may be applied only throughout a limited area adjacent the top or adjacent the bottom, or throughout a limited area at both the top and the bottom of the detector member, since the engagement of the non-conductive coating with one contact of a pair will not close a circuit including a translating device. The arrangement of the bridging contact portion of the detector member and of the electro-non-conductive portion of that member will vary with the number and arrangement of the contacts associated with the translating device.

In the playing of the game, the procedure is as follows:—

A player is handed one or a number of different detector members. The proposition or the question upon the detector member can be read by the player and then, according to his or her opinion of the correctness of the proposition, or of the answer to the question, he or she is required to place the detector member face upwardly upon one of the panels 13 or 14.

In the accompanying drawing, the proposition is "Ponce De Leon discovered Florida". If the player thinks that this is correct, he places the detector member upon the panel 14. As so placed, it will be noted that the electro-conductive material forming the bridge contact member will be engaged with the contacts 21 and 22, while the electro-non-conductive coating 38 will be engaged with the contacts 17 and 18. Of course, it is necessary that enough pressure be exerted upon the detector member to ensure a good contact of the electro-conductive and the electro-non-conductive portions of the detector member with the two pairs of contacts associated with the panel 14.

When the detector member is so placed, a circuit will be set up from the cell 23 through the conductors 34 and 25, lamp 11, leads 27 and 28, contact 21 through the electro-conductive portion 37 of the detector member to the contact 22, and through the leads 24 and 33 to the opposite pole of the cell, thus energizing the translating device 11 to cause the showing of a green light. This, according to instructions on the base, indicates that the player is correct.

On the contrary, if the player thinks that the proposition is incorrect, the detector member is placed upon the panel 13. When so placed, the electro-conductive portion 37 of the detector member will be engaged with the contacts 19 and 20 and the electro-non-conductive portion 38 will be engaged with the contacts 15 and 16. This positioning of the detector member closes a circuit including the leads 34, 25 and 26, the translating device 12, the leads 29 and 30, the contact 19, the bridge contact formed by the electro-conductive portion 37 of the detector member, the contact 20 and the leads 24 and 33 to the other pole of the cell 23. This actuates the translating device 12 to show a red light to indicate that the player's opinion is wrong.

When the detector member is placed upon the panel 14 as described, the electro-non-conductive portion 38 will engage one or both of the contacts 17 and 18, and thus insulate the electro-conductive portion 37 from either or both of said contacts and limit the current flow to between the contacts 21 and 22.

With the same positioning of the electro-non-conductive portion upon the detector member, when this member is placed upon the panel 13, the electro-non-conductive portion 38 will insulate the electro-conductive portion 37 of the member from one or both of the contacts 15 and 16, and thus limit the current flow to between the contacts 19 and 20.

It will be noted that the energizing of a translating device does not indicate the correctness or falsity of the proposition or the proper answer to a question upon the detector member. It merely indicates whether or not the opinion of the player is correct or incorrect, and constitutes a sort of intelligence test as in determining the I. Q. of a person.

Let us suppose that the proposition or question upon the detector member is wrong or requires a negative answer. If the player places the detector member upon the panel 14 to show that his or her opinion is that the proposition is correct and not wrong, then a circuit will be closed to cause a current flow from one side of the cell, through the leads 34, 25 and 26, the translating device 12, the lead 29 to the contact 17, through the bridging contact formed by the electro-conductive portion 37 of the detector member to the contact 18, and thence through the leads 24 and 33 to the other side of the cell, thus causing the translating device 12 to be energized and indicating that the opinion of the player is wrong by the showing of a red light.

If, on the other hand, the player thinks the proposition is wrong, or requires a negative answer, the detector member is placed upon the panel 13, thus closing a circuit from one side of the source, through the leads 34 and 25 to the translating device 11, and through the lead 27 to the contact 15, across the portion 37 of the detector member forming the bridging contact to the contact 16, and thence through the leads 24 and 33 to the other side of the source, thus energizing the translating device 11 so as to indicate that the player is right in his opinion that the proposition is false or the answer to the question is no.

With a detector member such as is last referred to, it is necessary that the electro-non-conductive coating be at the right of the translating device in the embodiment of the invention shown, instead of at the left as shown in the drawing. The position of this electro-non-conductive portion of the detector member is predetermined, according to the correctness or incorrectness of the proposition appearing upon the detector member, or whether or not any question thereon must be answered in the positive or the negative.

It is desired to emphasize that the placing of the detector member in relation to either panel does not result in a condition indicating whether or not the proposition upon the detector member is right or wrong, or whether the question requires an answer in the positive or negative, but does indicate whether the opinion of the player, as to such, is either right or wrong.

It is obvious that the detailed construction and arrangement of parts shown in the accompanying drawing is not essential to the production of a game apparatus embodying the invention, so long as the actuation of the translating device is in accordance with that heretofore described.

The details as to the form and arrangement of the contacts, and the manner of mounting the cell or the lamps in relation to the base are all immaterial to the invention, and such details are susceptible of wide variation. In fact, the number of panels and the number and form of the translating devices upon the base may be varied without departing from the spirit and scope of the invention, and a panel with dummy or unconnected contacts may be used to indicate the blankness of the mind of the player as to the subject presented.

The words "translating device" as herein used, means an electro-receptive device indicating visibly or audibly the closing of an electric circuit.

The word "detector" as herein used, means a contact making device having indicated thereon matter, the truth or falsity of which may be determined or detected according to the position of this member in relation to the contacts upon the base.

It is, therefore, not my intention to limit the invention to such details, it being obvious that they may be varied without departing from the spirit and scope of the invention.

Having described the invention, what I claim as new and desire to have protected by Letters Patent, is:

1. A game embodying therein a base having a plurality of pairs of electrical contacts arranged in spaced relation to each other and to the contacts of other pairs, and indicia thereon diametrically opposite meanings adjacent the respective pairs of contacts, a translating device, an electrical source, electrical connections between said source and one of each of said pair of contacts, and the other contact of each pair and said translating device, and a detector member adapted to be selectively positioned in relation to different pairs of contacts, said member having indicated thereon matter, the truth or falsity of which may be determined according to the positioning of this member in relation to the different pairs of contacts, said detector member having electro-conductive and electro-non-conductive portions, whereby said translating device may be energized by closing the circuit through either pair of contacts according to the positioning of the electro-conductive portion upon said detector member.

2. A game embodying therein a base having indicated thereon a plurality of spaced panels, each panel having thereon indicia, that on one panel having a diametrically opposite meaning to that on the other panel, a plurality of pairs of spaced contacts in each panel, a plurality of translating devices, an electrical source, one pair of contacts in each panel being adapted to be placed in circuit with one of said translating devices, and other pairs of contacts in each panel being adapted to be placed in circuit with other translating devices, the contacts of the different panels adapted to be placed in circuit with the same translating device being dissimilarly positioned in relation to each panel, and a detector member adapted to be selectively positioned upon different panels, said member having indicated thereon matter, the truth or falsity of which may be determined according to the positioning of this member in relation to the different panels, a portion of said member engageable with one pair of contacts of the panel being of electro-conductive material, and a portion of said member engageable with another pair of contacts of the same panel being of electro-non-conductive material.

3. A game embodying therein a base of electro-non-conductive material having indicated thereon a plurality of spaced panels, each panel having thereon indicia, that on one panel having a diametrically opposite meaning to that on the other panel, a plurality of pairs of spaced contacts in each panel, each of said contacts being secured to, with the top thereof projecting beyond the top plane of, said base, a plurality of translating devices, an electrical source, one pair of contacts in each panel being adapted to be placed in circuit with one of said translating devices, and other pairs of contacts in each panel being adapted to be placed in circuit with other translating devices, the contacts of the different panels adapted to be placed in circuit with the same translating device being dissimilarly positioned in relation to each panel, and a detector member adapted to be selectively positioned upon different panels, said member having indicated thereon matter, the truth or falsity of which may be determined according to the positioning of this member in relation to the different panels, a portion of said member engageable with one pair of contacts of the panel being of electro-conductive material, and a portion of said member engageable with another pair of contacts of the same panel being of electro-non-conductive material.

4. A game embodying therein a base having a plurality of pairs of electrical contacts arranged in spaced relation to each other and to the contacts of other pairs, and indicia thereon having diametrically opposite meanings adjacent the respective pairs of contacts, a translating device, an electrical source, electrical connections between said source and one of each of said pair of contacts, and the other contact of each pair and said translating device, and a detector member adapted to be selectively positioned in relation to different pairs of contacts, said member having indicated thereon matter, the truth or falsity of which may be determined according to the positioning of this member in relation to the different pairs of contacts, said detector member having electro-conductive and electro-non-conductive portions, whereby said translating device may be energized by closing the circuit through either pair of contacts according to the positioning of the electro-conductive portion upon said detector member, said electro-conductive and said electro-non-conductive portions of said detector member being indistinguishable one from the other, either by the eye or by the sense of touch.

5. A game embodying therein a base of electro-non-conductive material having indicated thereon a plurality of spaced panels, each panel having thereon indicia, that on one panel having a diametrically opposite meaning to that on the other panel, a plurality of pairs of spaced contacts in each panel, each of said contacts being secured to, with the top thereof projecting beyond the top plane of, said base, a plurality of translating devices, an electrical source, one pair of contacts in each panel being adapted to be placed in circuit with one of said translating devices, and other pairs of contacts in each panel being adapted to be placed in circuit with other translating devices, the contacts of the different panels adapted to be placed in circuit with the same translating device being dissimilarly positioned in relation to each panel, the electrical connections forming the various circuits being mounted upon the under face of said base and being concealed by a backing of electro-non-conductive material, and a detector member adapted to be selectively positioned upon different panels, said member having indicated thereon matter, the truth or falsity of which may be determined according to the positioning of this member in relation to the different panels, a portion of said member engageable with one pair of contacts of the panel being of electro-conductive material, and a portion of said member engageable with another pair of contacts of the same panel being of electro-non-conductive material.

6. A game embodying therein a base having a plurality of pairs of electrical contacts arranged in spaced relation to each other and to the contacts of other pairs, and indicia thereon having diametrically opposite meanings adjacent the respective pairs of contacts, a translating device, an electrical contact forming support for an electric cell carried by said base, an electric cell removably mounted in said support, electrical connections between one terminal of said contact forming support and one of each of said pair of contacts, and between the other terminal of said support and said translating device, and a detector member adapted to be selectively positioned in relation to different pairs of contacts, said member having indicated thereon matter, the truth or falsity of which may be determined according to the positioning of this member in relation to the different pairs of contacts, said detector member having electro-conductive and electro-non-conductive portions, whereby said translating device may be energized by closing the circuit through either pair of contacts according to the positioning of the electro-conductive portion upon said detector member.

7. A game embodying therein a base of electro-non-conductive material having indicated thereon a plurality of spaced panels, each panel having thereon indicia, that on one panel having a diametrically opposite meaning to that on the other panel, a plurality of pairs of spaced contacts in each panel, each of said contacts being secured to, with the top thereof projecting beyond the top plane of, said base, a plurality of translating devices, an electrical contact forming support for an electric cell carried by said base, an electric cell removably mounted in said support, one pair of contacts in each panel being adapted to be placed in circuit with one of said translating devices, and other pairs of contacts in each panel being adapted to be placed in circuit with other translating devices, the contacts of the different panels adapted to be placed in circuit with the same translating device being dissimilarly positioned in relation to each panel, and a detector member adapted to be selectively positioned upon different panels, said member having indicated thereon matter, the truth or falsity of which may be determined according to the positioning of this member in relation to the different panels, a portion of said member engageable with one pair of contacts of the panel being of electro-conductive material, and a portion of said member engageable with another pair of contacts of the same panel being of electro-non-conductive material.

8. A game embodying therein a base having indicated thereon a plurality of spaced panels, each panel having thereon indicia, that on one panel having a diametrically opposite meaning to that on the other panel, a plurality of pairs of spaced contacts in each panel, a plurality of translating devices, an electrical source, one pair of contacts in each panel being adapted to be placed in circuit with one of said translating devices, and other pairs of contacts in each panel being adapted to be placed in circuit with other translating devices, the contacts of the different panels adapted to be placed in circuit with the same translating device being dissimilarly positioned in relation to each panel, and a detector member of electro-non-conductive material adapted to be selectively positioned upon different panels, said member having indicated thereon matter, the truth or falsity of which may be determined according to the positioning of this member in relation to the different panels, and a surface coating of electro-conductive material throughout one face thereof, a portion of said coating of electro-conductive material being coated with thin, transparent, electro-non-conductive material, whereby the portion of the electro-conductive coating upon said member will engage and bridge one pair of contacts to close a circuit across same and the electro-non-conductive coating, and will prevent the closing of the circuit across another pair of contacts.

9. A game embodying therein a base having indicated thereon a plurality of spaced panels, each panel having thereon indicia, that on one panel having a diametrically opposite meaning to that on the other panel, a plurality of pairs of spaced contacts in each panel, a plurality of translating devices, an electrical source, one pair of contacts in each panel being adapted to be placed in circuit with one of said translating devices, and other pairs of contacts in each panel being adapted to be placed in circuit with other translating devices, the contacts of the different panels adapted to be placed in circuit with the same translating device being dissimilarly positioned in relation to each panel, and a detector member of electro-non-conductive material adapted to be selectively positioned upon different panels, said member having indicated thereon matter, the truth or falsity of which may be determined according to the positioning of this member in relation to the different panels, and one surface thereof coated with a metal foil, a portion of said metal foil being coated with thin, transparent, electro-non-conductive material, whereby the metal foil upon said member will engage and bridge one pair of contacts to close a circuit across same and the electro-non-conductive coating, and will prevent the closing of the circuit across another pair of contacts.

10. A detector member embodying therein an electro-conductive surface having portions thereof coated with electro-non-conductive material.

11. A detector member composed of electro-non-conductive material having a surface coating of electro-conductive material throughout the entire area thereof, and a coating of electro-non-conductive material throughout a portion of the electro-conductive material.

12. A detector member composed of electro-non-conductive material having a surface coating of electro-conductive material throughout the entire area thereof, and a coating of thin, transparent, electro-non-conductive material throughout a portion of the electro-conductive material.

13. A detector member composed of electro-non-conductive material having a coating of metal foil upon one face thereof, a portion of said metal foil having a thin coating of electro-non-conductive material.

14. A detector member composed of electro-non-conductive material having a coating of metal foil upon one face thereof, a portion of said metal foil having a thin coating of transparent electro-non-conductive material.

HARRY G. CISIN.